Patented Mar. 16, 1948

2,437,867

UNITED STATES PATENT OFFICE 2,437,867

ORGANIC ISOCYANATES

John Joseph Verbanc, Wilmington, Del., assignor to E. I. du Pont de Nemours & Company, Wilmington, Del., a corporation of Delaware No Drawing. Application June 1, 1946, Serial No. 673,887

19 Claims. (Cl. 260—453)

This invention relates to organic isocyanates and particularly to organic isocyanate compositions which are stable against polymerization.

It is known that organic isocyanates are somewhat unstable compounds which tend to polymerize on standing to form cyclic isocyanurates. The polymerization rate appears to be dependent upon the type of structure to which the isocyanate group is attached and the number of isocyanate groups present in the molecule. The aromatic isocyanates polymerize much more rapidly and readily than the aliphatic isocyanates, and the polyisocyanates, such as the diisocyanates, also polymerize more readily than the monoisocyanates. The resulting polymers are, in general, unreactive high melting solids which are insoluble in most organic solvents and the monomeric isocyanates cannot be regenerated therefrom by any known method.

The commercialization of the polyisocyanates for use as adhesives, modifiers for resins, interpolymerizables and as intermediates for the synthesis of other organic compounds has been greatly retarded by such instability. Purification of mixtures of the monomeric and polymeric isocyanates is usually difficult to obtain by the normal procedure of distillation because the polymer tends to decompose at distillation temperatures to yield large quantities of carbon dioxide and an amine which promptly reacts with the remainder of the isocyanate to produce ureas which have no value in the intended uses of the isocyanates. Purification of such mixtures by solvent extraction is both cumbersome and expensive.

It is an object of the present invention to provide organic isocyanate compositions which will be stable against polymerization over extended periods of time so that they can be transported and stored pending their utilization. Another object is to provide organic isocyanates having incorporated therein compounds which are soluble in the isocyanates and retard polymerization thereof without destroying the usefulness of the isocyanates. A further object is to provide organic isocyanates having incorporated therein compounds which stabilize the isocyanates against polymerization and which can be readily removed therefrom. A still further object is to provide a method for retarding the polymerization of organic isocyanates. Other objects are to provide new compositions of matter and to advance the art. Still other objects will appear hereinafter.

The above and other objects may be accomplished in accordance with my invention which comprises incorporating in an organic isocyanate a small proportion of an organic acyl halide, the isocyanate consisting of carbon, hydrogen and at least one —NCO group and the acyl halide consisting of carbon, hydrogen and at least one

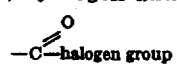

I have found that such acyl halides are very effective to inhibit the polymerization of such isocyanates over long periods of time and do not react with the isocyanates or destroy their usefulness. Thus, the isocyanate containing the acyl halide may be employed in its usually desired application. Where it is undesired to have the acyl halide present because it will react with a reagent with which the isocyanate is to be reacted or where it is desired to polymerize the isocyanate, the acyl halide may be readily removed by distillation.

The organic isocyanates, which may be treated in accordance with my invention, may be either saturated or unsaturated aliphatic, aromatic or heterocyclic. However, since the aromatic isocyanates are particularly unstable, my invention is especially valuable in the stabilization of such aromatic isocyanates. Also, my invention is particularly applicable to the treatment of the polyisocyanates and especially the diisocyanates. The organic isocyanates should not contain any nonhydrocarbon groups which would react with the acyl halide. My invention is particularly concerned with the treatment of the isocyanates which, except for the —NCO groups, consist of carbon and hydrogen.

Generally, any acyl halide which does not contain a substituent group reactive with an isocyanate will be effective for my purpose. They may be of the aliphatic, aromatic or hydroaromatic series. However, those of the aliphatic series appear to be much more effective than those of the aromatic series and will be preferred. The aliphatic acyl halides may be saturated or unsaturated. The acyl halides may contain one or a number of

However, those containing from 1 to 2

will be preferred. The halogen may be chlorine, bromine, iodine or fluorine, but preferably will be chlorine. Acetyl chloride, fumaryl chloride, propionyl chloride, succinyl chloride and benzoyl chloride, in particular, have been found to be satisfactory.

For practical purposes, the organic acyl halide will generally be used in the proportion of from 0.3% to 5.0% by weight based on the isocyanate. Smaller proportions, down to 0.05%, may be used where stabilization for a shorter period of time is desired. Larger amounts than 5% may be used, but without advantage. Usually, from about 1% to about 2% of the acyl halide will be sufficient for commercial purposes and will be preferred.

The acyl halides are in general soluble in the isocyanates and may be added directly to the substantially pure organic isocyanates. However, it is preferred to treat the isocyanate in an inert organic solvent, as the acyl halides are most effective in such solvents. Examples of suitable solvents are—ortho-dichloro benzene, kerosene, xylene, benzene, carbon tetrachloride, trichloro ethylene, chloro benzene, nitro benzene and the like. Mixtures of such solvents may also be used where they are compatible.

In order to more clearly illustrate my invention, preferred modes of carrying the same into effect and advantageous results to be obtained thereby, the following examples are given:

EXAMPLE I

A double distilled sample of "MDI" (methylene-bis (4-phenyl isocyanate)) was mixed with an equal weight of dry, distilled ODCB (ortho-dichloro benzene). After good mixing to insure complete solution of the isocyanate, the sample was divided into 12 equal parts and placed in clean dry pyrex test tubes. Six samples were retained as controls and to the remaining six was added 0.1 g. of C. P. acetyl chloride (1% based on "MDI" content). The test tubes were then closed and stored at room temperature (25–30° C.) in diffused sunlight for various lengths of time. After seven days aging, one of the samples from each series was removed and examined for polymer. If the tube contained polymer, the contents were warmed to 50° C. and filtered on a glass funnel to remove insoluble matter. The solid (polymer of isocyanate) was well washed with dry benzene and finally dried. The following table contains data, obtained by using this test on samples aged for various lengths of time.

TABLE I

Stabilization of "MDI" in ODCB solution

| Aging Period in Days | Per Cent Polymer Found | |
|---|---|---|
| | Control (No Stabilizer) | 1% Acetyl Chloride |
| 7 | 1.4 | None, solution clear. |
| 10 | 2.4 | Do. |
| 14 | 3.1 | Do. |
| 21 | 4.8 | Do. |
| 28 | 20.0 | Do. |
| 35 | | Do. |

The solutions of "MDI," containing 1% acetyl chloride, were absolutely clear after 35 days' storage in pyrex containers. Furthermore, there was no indication that the isocyanate had been destroyed, since it gave the normal reactions of isocyanates and the acetyl chloride was recoverable therefrom by distillation leaving the isocyanate unchanged.

EXAMPLE II

Other acyl chlorides were also found to stabilize solutions of "MDI." In all instances shown in Table II, 50% solutions of distilled "MDI" in ODCB were used. Each stabilizer was added to the solution in the amount of 2% of the "MDI" and well mixed by shaking. The solutions were aged in closed glass containers at room temperature and examined visually for polymer which precipitates on forming. The following results were obtained:

TABLE II

Stabilization of distilled "MDI" in ODCB solution (Days at 25–30° C. to first appearance of polymer)

| Name of Stabilizer | Days |
|---|---|
| None | 1. |
| Acetyl chloride | None in 69. |
| Fumaryl chloride | None in 21. |
| Propionyl chloride | None in 69. |
| Succinyl chloride | None in 21. |

EXAMPLE III

Employing the same techniques as described in Example II, a series of stabilization tests were made, using various quantities of acetyl chloride as the stabilizer. The test data obtained is listed in Table III.

TABLE III

Stabilization of "MDI" (50% in ODCB) solution with acetyl chloride (Days at 25–30° C. to first appearance of polymer)

| Days | Amount of Stabilizer Added |
|---|---|
| 1 | None (control). |
| 12 | 0.33%. |
| 28 | 0.67%. |
| None at 28 | 1.00%. |
| None at 28 | 2.00%. |

EXAMPLE IV

Acyl chlorides have also been found to act as stabilizers for crude "MDI." Using the technique described above, samples of crude "MDI" (not distilled or further purified) were tested for polymer formation under various conditions. The crude "MDI" was made by phosgenating 4,4'-diamino diphenyl methane in ODCB, blowing with nitrogen to remove HCl and excess phosgene, concentrating and then separating the "MDI." This crude "MDI" is a dark colored oil, containing traces of ODCB and about 93% to about 95% "MDI." The data obtained is recorded in Table IV.

TABLE IV

Stabilization of crude "MDI" (methylene-bis (4-phenyl isocyanate))

(Six weeks' storage at 25–30° C.)

| | | Type of Container | Polymer |
|---|---|---|---|
| | | | Per cent |
| 1 | Crude "MDI" | Pyrex glass | 4.0 |
| 2 | Crude "MDI"—50% in orthodichloro benzene. | do | 4.0 |
| 3 | Crude "MDI"—50% in orthodichloro benzene+1% acetyl chloride (based on "MDI"). | do | 0.0 |
| 4 | Crude "MDI"—50% in orthodichloro benzene. | Soft glass | 20.6 |
| 5 | Crude "MDI"+% acetyl chloride. | do | 0.6 |
| 6 | Crude "MDI"—50% in ODCB+1% acetyl chloride (based on "MDI"). | do | 0.2 |

The above data shows that acetyl chloride is an excellent stabilizer for crude methylene-bis (4-phenyl isocyanate). It also shows that soft glass containers appear to be less desirable for storage since soft glass appears to catalyze polymer formation. However, the addition of 1% acetyl chloride inhibits polymerization of the "MDI," even when stored in the presence of soft glass.

EXAMPLE V

Other isocyanates have also been successfully stabilized with organic acyl chlorides. A sample of 2,4-tolylene diisocyanate (50% solution in ODCB), containing 1% acetyl chloride based on isocyanate content, was aged in glass at 25–30° C. After 2 weeks aging, the solution containing the stabilizer showed no signs of polymer formation whereas the control (no stabilizer) had already started to polymerize.

It will be understood that the preceding examples are given for illustrative purposes solely and that my invention is not to be limited to the specific embodiments disclosed therein. Many variations and modifications can be made in the isocyanates treated, the acyl halides employed, the organic solvents, the proportions and degree of concentration in the solvent and the modes of admixing the acyl halide with the isocyanate. For example, other organic isocyanates, which may be treated in accordance with my invention, are: Hexyl isocyanate; hexamethylene diisocyanate; decamethylene diisocyanate; ethylene diisocyanate; butane-1,2,2-triisocyanate; phenyl isocyanate; meta-phenylene diisocyanate; paraphenylene diisocyanate; triisocyanate from p-fuchsin; benzene-1,2,4-triisocyanate; 4,4',4''-triphenyl methane triisocyanate; butylene-1, 3-diisocyanate; butylene-2,3-diisocyanate; cyclo-alkylene diisocyanates, such as cyclo-hexylene-1,2-diisocyanate and aliphatic aromatic diisocyanates such as xylylene diisocyanate. Accordingly, I intend to claim my invention broadly as in the appended claims.

From the foregoing, it will be apparent that, by my invention, I have provided organic isocyanate compositions which do not tend to polymerize, but are stable over long periods of time. In most instances, the small amount of stabilizer will not interfere with the normal reactions of the isocyanate and moreover can be easily removed by distillation if desired. By this invention, the commercial utilization of the unstable isocyanates has been made practical.

I claim:

1. An organic isocyanate which, except for the —NCO groups, consists of carbon and hydrogen, having admixed therewith from about 0.3% to about 5.0% of an organic carboxylic acid halide which, except for the

consists of carbon and hydrogen.

2. An organic diisocyanate which, except for the —NCO groups, consists of carbon and hydrogen, having admixed therewith from about 0.3% to about 5.0% of an organic carboxylic acid halide which, except for 1 to 2

consists of carbon and hydrogen.

3. An aromatic diisocyanate which, except for the —NCO groups, consists of carbon and hydrogen, having admixed therewith from about 0.3% to about 5.0% of an aliphatic carboxylic acid halide which, except for 1 to 2

consists of carbon and hydrogen.

4. An aromatic diisocyanate which, except for the —NCO groups, consists of carbon and hydrogen, having admixed therewith from about 0.3% to about 5.0% of an aliphatic carboxylic acid chloride which, except for 1 to 2

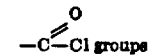

consists of carbon and hydrogen.

5. An aromatic diisocyanate which, except for the —NCO groups, consists of carbon and hydrogen, having admixed therewith from about 0.3% to about 5.0% of acetyl chloride.

6. Methylene-bis (4-phenyl isocyanate) having admixed therewith from about 0.3% to about 5.0% of an aliphatic carboxylic acid halide which, except for 1 to 2

consists of carbon and hydrogen.

7. Methylene-bis (4-phenyl isocyanate) having admixed therewith from about 0.3% to about 5.0% of an aliphatic carboxylic acid chloride which, except for 1 to 2

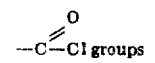

consists of carbon and hydrogen.

8. Methylene-bis (4-phenyl isocyanate) having admixed therewith from about 0.3% to about 5.0% of acetyl chloride.

9. A solution of an organic isocyanate and an organic carboxylic acid halide in an inert organic solvent in which the acid halide is present in an amount of from about 0.3% to about 5.0% based on the isocyanate, the isocyanate consisting of carbon, hydrogen and at least one —NCO group and the acid halide consisting of carbon, hydrogen and at least one

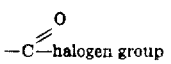

10. A solution of an organic diisocyanate and an organic carboxylic acid halide in an inert organic solvent in which the acid halide is present in an amount of from about 0.3% to about 5.0% based on the diisocyanate, the diisocyanate consisting of carbon, hydrogen and 2 —NCO groups and the acid halide consisting of carbon, hydrogen and 1 to 2

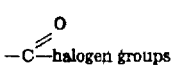

11. A solution of an aromatic diisocyanate and an aliphatic carboxylic acid halide in an inert organic solvent in which the acid halide is present in an amount of from about 0.3% to about 5.0% based on the diisocyanate, the diisocyanate consisting of carbon, hydrogen and 2 —NCO groups and the acid halide consisting of carbon, hydrogen and 1 to 2

12. A solution of an aromatic diisocyanate and an aliphatic carboxylic acid chloride in an inert organic solvent in which the acid chloride is present in an amount of from about 0.3% to about 5.0% based on the diisocyanate, the diisocyanate consisting of carbon, hydrogen and 2 —NCO groups and the acid chloride consisting of carbon, hydrogen and 1 to 2

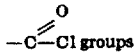 groups

13. A solution of an aromatic diisocyanate and an aliphatic carboxylic acid chloride in an inert organic solvent in which the acid chloride is present in an amount of from about 0.3% to about 5.0% based on the diisocyanate, the diisocyanate consisting of carbon, hydrogen and 2 —NCO groups and the acid chloride consisting of carbon, hydrogen and a single

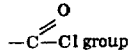

14. A solution of an organic diisocyanate and acetyl chloride in an inert organic solvent in which the acetyl chloride is present in an amount of from about 0.3% to about 5.0% based on the diisocyanate, the diisocyanate consisting of carbon, hydrogen and 2 —NCO groups.

15. A solution of methylene-bis (4-phenyl isocyanate) and an organic carboxylic acid halide in an inert organic solvent in which the acid halide is present in an amount of from about 0.3% to about 5.0% based on the isocyanate, the acid halide consisting of carbon, hydrogen and 1 to 2

16. A solution of methylene-bis (4-phenyl isocyanate) and an aliphatic carboxylic acid chloride in an inert organic solvent in which the acid chloride is present in an amount of from about 0.3% to about 5.0% based on the isocyanate, the acid chloride consisting of carbon, hydrogen and 1 to 2

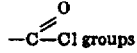 groups

17. A solution of methylene-bis (4-phenyl isocyanate) and an aliphatic carboxylic acid chloride in an inert organic solvent in which the acid chloride is present in an amount of from about 0.3% to about 5.0% based on the isocyanate, the acid chloride consisting of carbon, hydrogen and a single

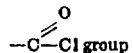 group

18. A solution of methylene-bis (4-phenyl isocyanate) and acetyl chloride in an inert organic solvent in which the acetyl chloride is present in an amount of from about 0.3% to about 5.0% based on the methylene-bis (4-phenyl isocyanate).

19. A solution of methylene-bis (4-phenyl isocyanate) and acetyl chloride in ortho-dichloro benzene, the methylene-bis (4-phenyl isocyanate) being present in a concentration of about 50% by weight and the acetyl chloride being present in an amount of about 1% by weight based on the methylene-bis (4-phenyl isocyanate).

JOHN JOSEPH VERBANC.

REFERENCES CITED

The following references are of record in the file of this patent:

UNITED STATES PATENTS

| Number | Name | Date |
| --- | --- | --- |
| 2,326,501 | Siefken et al. | Aug. 10, 1943 |

Certificate of Correction

Patent No. 2,437,867.      March 16, 1948.

JOHN JOSEPH VERBANC

It is hereby certified that error appears in the printed specification of the above numbered patent requiring correction as follows: Column 4, Table IV, line 71, for "% acetyl" read *1% acetyl*; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.* groups and the acid chloride consisting of carbon, hydrogen and 1 to 2

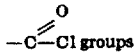 groups

13. A solution of an aromatic diisocyanate and an aliphatic carboxylic acid chloride in an inert organic solvent in which the acid chloride is present in an amount of from about 0.3% to about 5.0% based on the diisocyanate, the diisocyanate consisting of carbon, hydrogen and 2 —NCO groups and the acid chloride consisting of carbon, hydrogen and a single

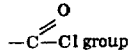

14. A solution of an organic diisocyanate and acetyl chloride in an inert organic solvent in which the acetyl chloride is present in an amount of from about 0.3% to about 5.0% based on the diisocyanate, the diisocyanate consisting of carbon, hydrogen and 2 —NCO groups.

15. A solution of methylene-bis (4-phenyl isocyanate) and an organic carboxylic acid halide in an inert organic solvent in which the acid halide is present in an amount of from about 0.3% to about 5.0% based on the isocyanate, the acid halide consisting of carbon, hydrogen and 1 to 2

16. A solution of methylene-bis (4-phenyl isocyanate) and an aliphatic carboxylic acid chloride in an inert organic solvent in which the acid chloride is present in an amount of from about 0.3% to about 5.0% based on the isocyanate, the acid chloride consisting of carbon, hydrogen and 1 to 2

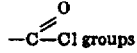 groups

17. A solution of methylene-bis (4-phenyl isocyanate) and an aliphatic carboxylic acid chloride in an inert organic solvent in which the acid chloride is present in an amount of from about 0.3% to about 5.0% based on the isocyanate, the acid chloride consisting of carbon, hydrogen and a single

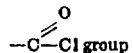 group

18. A solution of methylene-bis (4-phenyl isocyanate) and acetyl chloride in an inert organic solvent in which the acetyl chloride is present in an amount of from about 0.3% to about 5.0% based on the methylene-bis (4-phenyl isocyanate).

19. A solution of methylene-bis (4-phenyl isocyanate) and acetyl chloride in ortho-dichloro benzene, the methylene-bis (4-phenyl isocyanate) being present in a concentration of about 50% by weight and the acetyl chloride being present in an amount of about 1% by weight based on the methylene-bis (4-phenyl isocyanate).

JOHN JOSEPH VERBANC.

REFERENCES CITED

The following references are of record in the file of this patent:

UNITED STATES PATENTS

| Number | Name | Date |
|---|---|---|
| 2,326,501 | Siefken et al. | Aug. 10, 1943 |

---

Certificate of Correction

Patent No. 2,437,867.  March 16, 1948.

JOHN JOSEPH VERBANC

It is hereby certified that error appears in the printed specification of the above numbered patent requiring correction as follows: Column 4, Table IV, line 71, for "% acetyl" read *1% acetyl*; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*